United States Patent
Bhaskaran

(10) Patent No.: US 10,365,869 B2
(45) Date of Patent: Jul. 30, 2019

(54) DETERMINATION OF MOBILE DEVICE LOCATION AND TIME FOR AN ASSOCIATED PRINTING DEVICE

(71) Applicant: Hewlett-Packard Development Company, L.P., Houston, TX (US)

(72) Inventor: Shinoji Bhaskaran, Bangalore (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 15/313,177

(22) PCT Filed: Jan. 20, 2015

(86) PCT No.: PCT/US2015/012034
§ 371 (c)(1),
(2) Date: Nov. 22, 2016

(87) PCT Pub. No.: WO2015/183345
PCT Pub. Date: Dec. 3, 2015

(65) Prior Publication Data
US 2017/0192726 A1    Jul. 6, 2017

(30) Foreign Application Priority Data
May 29, 2014    (IN) .......................... 2654/CHE/2014

(51) Int. Cl.
*G06F 3/12*    (2006.01)

(52) U.S. Cl.
CPC .......... *G06F 3/1261* (2013.01); *G06F 3/1203* (2013.01); *G06F 3/1209* (2013.01); *G06F 3/1232* (2013.01); *G06F 3/1285* (2013.01); *G06F 3/1292* (2013.01); *G06F 3/1296* (2013.01)

(58) Field of Classification Search
USPC ........................................................ 358/1.15
See application file for complete search history.

(56) References Cited

U.S. PATENT DOCUMENTS

| | | | |
|---|---|---|---|
| 2011/0096354 A1* | 4/2011 | Liu ....................... | G06F 3/1204 358/1.15 |
| 2013/0107312 A1* | 5/2013 | Venkatesh ............. | G06F 3/1207 358/1.15 |

* cited by examiner

*Primary Examiner* — Ngon Nguyen
(74) *Attorney, Agent, or Firm* — HP Inc. Patent Department

(57) ABSTRACT

Examples disclosed herein relate to determination of mobile device location and time for an associated printing device. Examples include acquisition of a request to print content, via the remote printing service, at a printing device and, in response to the request, determination of whether a mobile device, associated with the printing device by the remote printing service, has been located at least a threshold distance away from the identified printing device for at least a threshold amount of time.

16 Claims, 3 Drawing Sheets

DETERMINATION OF MOBILE DEVICE LOCATION AND TIME FOR AN ASSOCIATED PRINTING DEVICE

BACKGROUND

A printing device, such as a printer, multifunction printer (MFP), or the like, may be utilized to print content on a physical medium such as paper. The printing device may receive an electronic representation of the content from a computing device, such as a desktop or laptop computer, connected to the printing device by a direct, wired connection, for example. In some examples, the printing device may be connected to a computer network and may receive content to be printed via the computer network from a computing device that is not directly connected to the printing device.

BRIEF DESCRIPTION OF THE DRAWINGS

The following detailed description references the drawings, wherein.

DETAILED DESCRIPTION

Figure 1:
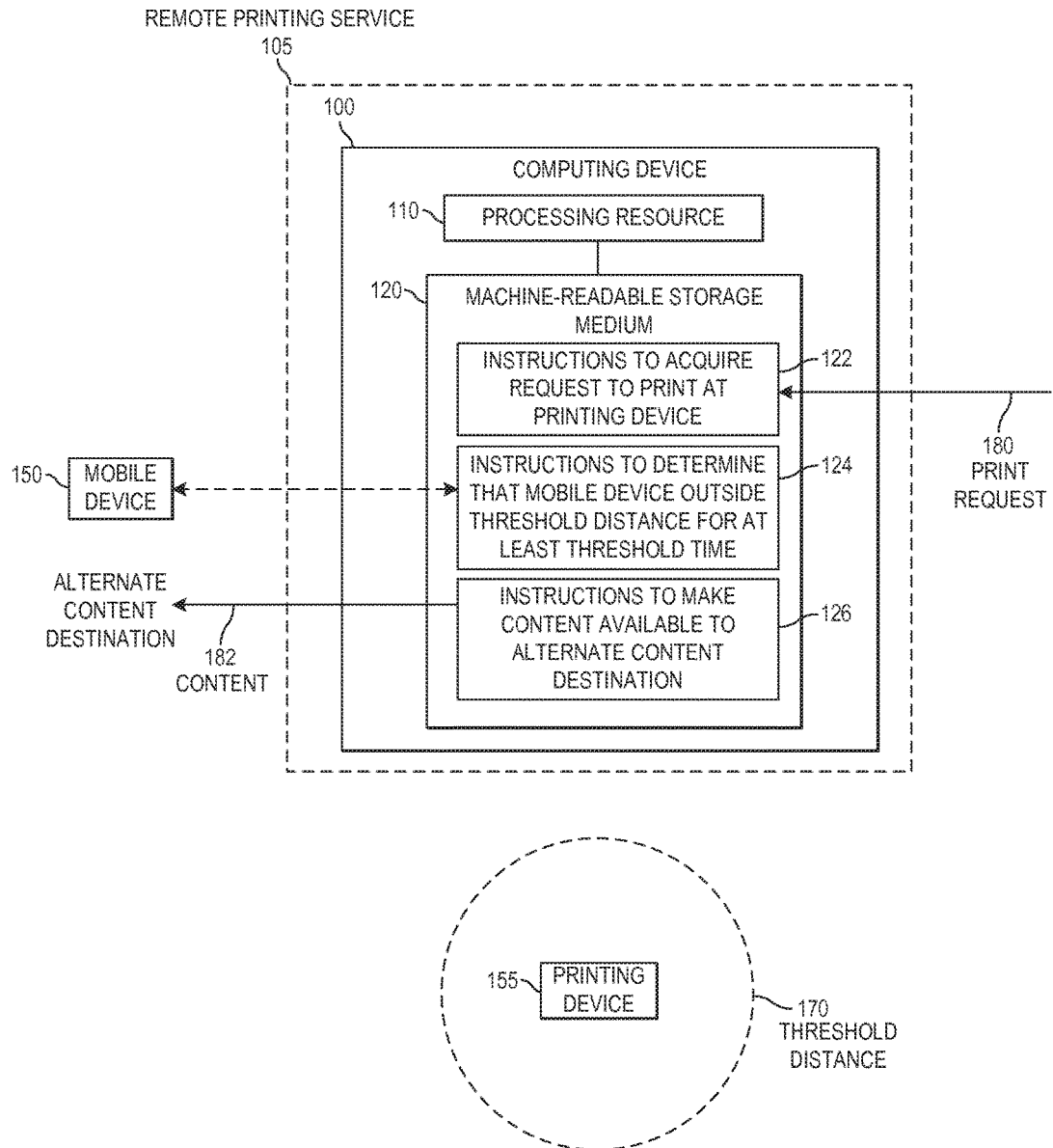
FIG. 1 is a block diagram of an example computing device of a remote printing service to make content available to an alternate content destination.

As noted above, a printing device may receive content to be printed via a computer network. For example, the printing device may be a web-connected printing device capable of printing content received via the internet from a remote printing service. As an example, the remote printing service may assign a destination email address to a destination printing device, and print, at the destination printing device, content received (or otherwise specified) via an email sent to the destination email address (which may be referred to herein as an 'email print job').

As another example, a user may subscribe a destination printing device to a service to provide pieces of content to be printed on the destination printing device in accordance with a predefined schedule. Such content may be referred to herein as "subscription content". In some examples, the destination printing device may be subscribed to the subscription service on the basis of its assigned destination email address for the remote printing service. As an example, the user may subscribe to print, on a scheduled basis, subscription content from a particular newspaper, subscription content related to the weather, or subscription content in the form of a custom publication describing events occurring in a local area over the coming weekend. Such content may be more valuable if consumed close to the time it is scheduled to be printed, and may be of little value to a user if consumed at a later time (one or more days later, for example).

However, in such examples, content provided by the remote printing service is associated with a particular destination printing device, both for email print jobs and subscription content. In some examples. If a destination printing device is located at a user's home, content from the remote printing service may be printed while the user is away from home (and the printer) for an extended period of time (e.g., day(s), week(s), etc.). In such examples, a user may return home after an extended time to find relatively old printed subscription content, which may be undesirable to the user since, as noted above, some subscription content may have relatively low value one or more days after the scheduled time for delivery, for example. In addition, the user may wish to receive the subscription content (e.g., news) even when the user is away from home, for example.

In some examples, a user may be able to turn off some or all printing from the remote printing service (e.g., subscription content). However, this may rely on a user remembering to do so, manually turning off the relevant printing, and then remembering to manually turn it back on when they return. This solution may not be desirable, however, as the user may not want to miss some content, such as print jobs sent by others as email print jobs, or certain subscription content that is not as time-sensitive (e.g., comics, coupons, etc.).

To address these issues, examples described herein may enable a remote printing service to make print content available to an alternate content destination if a user has been away from their destination printing device for a sufficient amount of time. In examples described herein, a remote printing service may acquire a request to print content, via the remote printing service, at a printing device identified in the request and, in response to the request, may determine that a mobile device, associated with the printing device by the remote printing service, has been located at least a threshold distance away from the identified printing device for at least a threshold amount of time. Examples described herein may further make the content available to an alternate content destination instead of the identified printing device based on the request and the determination. In some examples, the alternate printing device may be a printing device that the mobile device is determined to be near, or a user email address of the user.

In this manner, examples described herein may continue printing content from the remote printing service at the destination printing device unless the user's mobile device (e.g., smartphone) is away from the destination printing device for an extended period of time. In such examples, the remote printing service may continue printing at the user's designated destination printing device when the user is determined to be near the destination printing device or away for a relatively short time, so that the user is able to pick up the print jobs from the destination printing device immediately or upon returning from an absence of a relatively short time (e.g., returning from work, an errand, etc.). In such examples, the remote printing service may further redirect content to an alternate content destination when the user is determined to be away for a relatively long time (e.g., when the user is traveling). In this manner, examples described herein may enable content to typically be printed at a user-designated primary destination printing device, while also automatically redirecting print content to the user when they are away from the primary destination printing device for an extended period of time.

Referring now to the drawings, FIG. 1 is a block diagram of an example computing device 100 of a remote printing service 105 to make content available to an alternate content destination. As used herein, a "computing device" may be a desktop computer, notebook computer, workstation, tablet computer, mobile phone, smart device, server, blade enclosure, printing device, or any other processing device or equipment. In the example of FIG. 1, computing device 100 maybe a remote printing server to at least partially implement remote printing service 105 (e.g., computing device 100 may be one of a plurality of remote printing servers implementing remote printing service 105).

In examples described herein, a "remote printing service" may be a service implemented by one or more networked computing devices to receive a print request from a sending computing device and make available, to a destination printing device, content associated with the request, wherein the sending computing device and the destination printing device are each remote from the networked computing device(s) implementing the remote printing service. In examples described herein, a first computing device "remote" from a second computing device may be a first computing device that is separate from, and not directly connected to, the second computing device, wherein the first and second computing devices may access one another over a computer network. As used herein, a computer network may include, for example, local area network(s) (LAN(s)), wireless local area network(s) (WLAN(s)), virtual private network(s) (VPN(s)), the Internet, telephone network(s) (e.g., cellular telephone network(s)), or the like, or a combination thereof.

In the example of FIG. 1, computing device 100 includes a processing resource 110 and a machine-readable storage medium 120 encoded with instructions 122, 124, and 126. In some examples, storage medium 120 may include additional instructions. In some examples, instructions 122, 124, and 126, and any other instructions described herein in relation to storage medium 120, may be stored on a machine-readable storage medium remote from but accessible to computing device 100 and processing resource 110 (e.g., via a computer network).

In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may fetch, decode, and execute instructions stored on storage medium 120 to perform the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any type of volatile memory (e.g., Random Access Memory (RAM), etc.), non-volatile memory, flash memory, storage drive (e.g., a hard drive), solid state drive, storage disc (e.g., a compact disc, a DVD, etc.), and the like, or a combination thereof. Further, any machine-readable storage medium described herein may be non-transitory.

In the example or FIG. 1, instructions 122 may actively acquire (e.g., retrieve, etc.) or passively acquire (e.g., receive, etc.) a request 180 to print content, via remote printing service 105, at a printing device 155 identified in the request. In some examples, request 180 may be acquired via any suitable computer network from any suitable sender or content source, such as, for example, a subscription service (as described above), a sender computing device remote from computing device 100, or the like. In examples described herein, the content to be printed may be document(s) including at least one of text and image(s) in any suitable document format (e.g., word processor format, portable document format (PDF), etc.), or any other content suitable for physical production by the printing device that is to print the content.

Request 180 may specify the content to be printed by including the content in the request, or by including information (e.g., a reference, address, etc.) useable to obtain or otherwise access the content (e.g., via a computer network). Request 180 may further identify a destination printing device 155 to print the content by including a printing device identifier assigned to destination printing device 155 in remote printing service 105. In examples described herein, a printing device identifier may be any information identifying the printing device in the remote printing service.

In some examples, the printing device identifier may be an email address. In such examples, request 180 may be an email print job. For example, request 180 to print the content may comprise an email (i.e., at least one electronic mail message) addressed to a destination email address assigned to destination printing device 155 in remote printing service 105. In such examples, the email may include the destination email address assigned to destination printing device 155 as the email address in the "To" field of the email header, or the like, to identify destination printing device 155. In some examples, the email may indicate the content to be printed by, for example, including the content in the email (e.g., as an attachment), or including information useable to obtain the content (as described above).

In other examples, request 180 may be any other suitable type of request, such as a hypertext transfer protocol (HTTP) request, an application programming interface (API) function call, etc. In some examples, instructions 122 may acquire request 180 from a subscription service to provide different pieces of subscription content to the identified printing device in accordance with a predefined schedule, as described above. In such examples, the content of request 180 may be one of the pieces of subscription content.

In examples described herein, a 'printing device' may be a hardware device, such as a printer, multifunction printer (MFP), or any other device including at least functionalities to physically produce graphical representation(s) (e.g., text, images, etc.) on paper, or the like, or to produce physical object(s) (e.g., a printing device for three-dimensional (3D) printing). In some examples, an MFP may be capable of performing a combination of multiple different functionalities such as, for example, printing, photocopying, scanning, faxing, etc. In examples described herein, a printing device may be capable of communicating over a computer network, such as the internet, or the like. Such a printing device may be referred to herein as a "web-connected" printing device.

Figure 2:
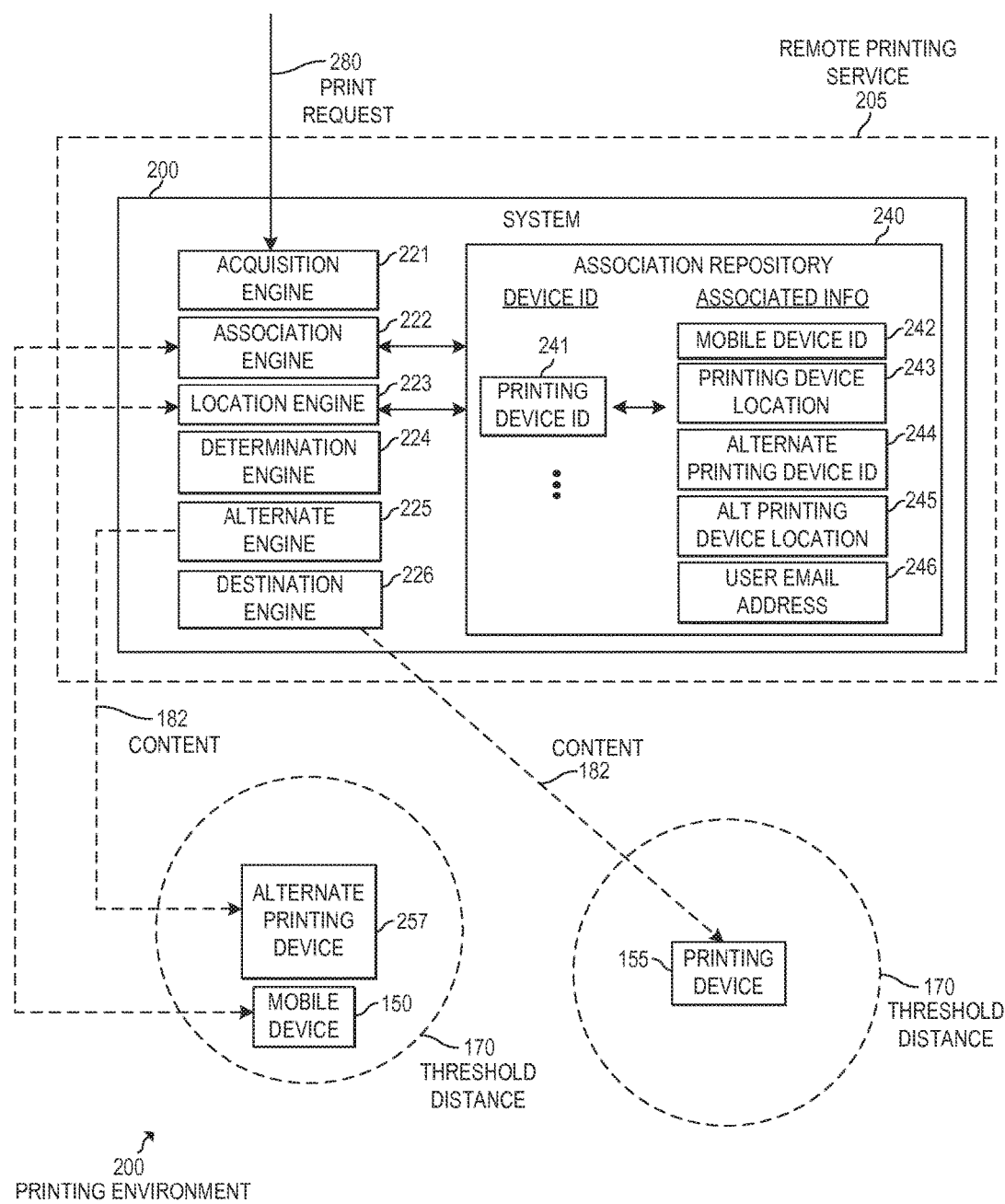
FIG. 2 is a block diagram of an example printing environment to determine whether a mobile device has been away from a destination printing device for at least a threshold amount of time.

In some examples, a user's mobile device 150 (e.g., the user's smartphone) may be associated with their destination printing device 155 in remote printing service 105 using, for example, a process described in more detail in relation to FIG. 2. In some examples, at least one mobile device identifier may be used to at least one of identify mobile device 150 to remote printing service 105 and associate mobile device 150 with destination printing device 155. In some examples, the mobile device identifier, and a request to associate it with printing device 155, may be provided to remote printing service 105 via a computer network using a remote computing device (e.g., mobile device 150), a printing device (e.g., printing device 150), or another device.

As used herein, a "mobile device" may be a mobile phone, smart device (e.g., smartphone), tablet computer, laptop, or any other computing device including a portable energy source (e.g., battery, etc.) capable of powering the device when not connected to an external power source. In examples described herein, a mobile device identifier may be any information identifying the mobile device. Example mobile device identifiers may include, for example, a telephone number assigned to the mobile device, a mobile device's International Mobile Station Equipment Identity (IMEI) number, serial number or other product-specific number, unique device ID (UDID), an operating system (OS) identifier, a machine address (MAC), or the like, or a combination thereof.

In the example of FIG. 1, instructions 124 may obtain respective geographical locations of mobile device 150 and destination printing device 155 in any suitable manner using any suitable technolog(ies), technique(s), or the like. In some examples, mobile device 150 may include a global positioning system (GPS) device (e.g., GPS receiver) capable of obtaining a current geographical location of mobile device 150. Mobile device 150 may also include machine-readable executable instructions (e.g., a computer application or 'app', a service, or the like) to provide the current geographical location of mobile device 150 to remote printing service 105 (e.g., computing device 100 of service 105) via a computer network (e.g., including the Internet). In some examples, the machine-readable executable instructions of mobile device 150 may periodically provide the current (or present) geographical location of mobile device 150 to remote printing service 105 via a computer network. For example, the instructions of mobile device 150 may provide the current geographical location to remote printing service 105 on a scheduled basis (e.g., every hour, or any other suitable length of time). In other examples, the instructions of mobile device 150 may provide the current geographical location to remote printing service 105 in response to changes in the geographical location of mobile device 150, such as when the geographical location changes by at least a threshold amount (e.g., 100 meters, 1 kilometer, etc.). In such examples, the threshold amount may be a default value for remote printing service 105, or may be customizable by users. The instructions of mobile device 150 may provide the current geographical location to the remote printing service 105 along with the mobile device identifier for mobile device 150 to identify the device whose location is being provided. In other examples, remote printing service 105 may obtain the current geographical location of a mobile device (e.g., mobile device 150) in any other suitable manner (e.g., by requesting the location from a cellular service provider that provides cellular phone service to the mobile device, as described below).

In some examples, instructions 124 may obtain a geographical location of destination printing device 155 by obtaining the geographical location of mobile device 150 when a user of mobile device 150 indicates that mobile device 150 is at approximately the same geographical location as destination printing device 155. Remote printing service 105 may store the obtained geographical location of destination printing device 155 in a repository (e.g., machine-readable storage medium) of or accessible to computing device 100, as described in more detail in relation to FIG. 2.

In the example of FIG. 1, in response to request 180, instructions 124 may determine whether mobile device 150, associated with destination printing device 155 by remote printing service 105, has been located at least a threshold distance 170 away from printing device 155 identified in request 180 for at least a threshold amount of time. In some examples, instructions 124 may determine whether, at the time of the determination, mobile device 150 has been located at least a threshold distance 170 away from the identified printing device 155 for at least the threshold amount of time. In some examples, instructions 124 may determine whether mobile device 150 has been located at least threshold distance 170 away from printing device 155 for at least threshold amount of time from the time of the determination.

In examples described herein, the threshold distance may be any suitable distance for determining whether a mobile device is in the approximate vicinity of a printing device, and may be a value set by a remote printing service (e.g., a default value), or a customizable value that may be set by a user of the remote printing service. Examples of the threshold distance may be, for example, 1 kilometer, 1 mile, or the like. In other examples, the threshold distance may be shorter or longer. In some examples, the threshold distance may define the radius of an area around a printing device, outside (or at the circumference) of which a mobile device may be considered to be at least the threshold distance away from a printing device.

In examples described herein, the threshold amount of time may be any amount of time suitable for determining that a mobile device is away from a printing device for an extended period of time, and may be a value set by a remote printing service (e.g., a default value), or a customizable value that may be set by a user of the remote printing service. Examples of the threshold amount of time may be, for example, 10 hours, 24 hours, or the like. In other examples, the threshold amount of time may be shorter or longer. In some examples, the threshold amount of time is a continuous duration of time immediately preceding the time of the determination.

In examples described herein, instructions 124 may track, over time, whether mobile device 150 is at least the threshold distance 170 away from destination printing device 155 in any suitable manner. In some examples, instructions 124 may periodically compare the current geographical location of mobile device 150 to the stored geographical location of printing device 155 to determine whether the mobile device 150 is at least the threshold distance 170 away from destination printing device 155. In such examples, instructions 124 may store a time value indicating the last time (e.g., date and time) mobile device 150 was found to be less than threshold distance 170 away from printing device 155. In such examples, each time mobile device 150 is determined to be less than threshold distance 170 away from printing device 155, instructions 124 may update the time value to a current time (e.g., a time of the determination, a time the mobile device location was obtained, etc.). In such examples, each time mobile device 150 is determined to be at least the threshold distance 170 away from printing device 155, instructions 124 may leave or maintain the previously set time value. In such examples, instructions 124 may compare the current geographical location of mobile device 150 to the stored geographical location of printing device 155 and selectively update the time value (as described above) each time remote printing service 105 obtains a new current geographical location for mobile device 105. For example, instructions 124 may perform the comparison and selective update whenever mobile device 150 reports its current geographical location, or whenever remote printing service 105 obtains the location from the cellular service provider.

In such examples, in response to request 180, instructions 124 may utilize the stored time value to determine whether mobile device 150 has been located at least a threshold distance 170 away from the identified printing device 155 for at least the threshold amount of time. For example, instructions 124 may determine that mobile device 150 has been located at least threshold distance 170 away from printing device 155 for at least the threshold amount of time when the difference between the current time (e.g., the time of the determination) and the stored time value (e.g., the current time value minus the stored time value) is greater than or equal to the threshold amount of time. In such examples, instructions 124 may determine that mobile device 150 has not been located at least threshold distance 170 away from printing device 155 for at least the threshold amount of time when the difference between the current time and the stored time value is less than the threshold amount of time.

Although an example manner in which instructions 124 may determine whether mobile device 150 has been located at least a threshold distance 170 away from the identified printing device for at least a threshold amount of time, in other examples, this determination may be made in any other suitable manner.

For example, remote printing service 105 may request the geographic location of mobile device 150. As an example, remote printing service 105 may at various times request the geographic location of mobile device 150 from a cellular service provider that provides cellular phone service to mobile device 150. In such examples, a user of mobile device 150 may provide the cellular service provider permission to share the geographical location of mobile device 150 with remote printing service 105. In such examples, the cellular service provider may determine the geographical location of mobile device 150 in any suitable manner (e.g., using any suitable type of mobile phone tracking, global system for mobile communications (GSM) localization, etc.). Remote printing service 105 may request the location of mobile device 150 from the cellular service provider using any mobile device identifier associated with mobile device 150 by the cellular service provider (e.g., telephone number, etc.).

In some examples, remote printing service 105 may utilize the above described stored time value and geographical locations requested from a cellular service provider. In such examples, in response to request 180, instructions 124 may attempt to determine a current location of mobile device 150 by requesting the current geographical location for mobile device 150 from the cellular service provider. When instructions 124 determine, based on the current geographical location returned by the cellular service provider, that mobile device 150 is at least the threshold distance 170 away from printing device 155, instructions 124 may determine that mobile device 150 has been located at least a threshold distance 170 away from the identified printing device for at least a threshold amount of time when the difference between the current time and the stored time value is greater than or equal to the threshold amount of time.

In such examples, when instructions 124 are not able to obtain the current geographical location of mobile device 150 from the cellular service provider (e.g., due to an error, or failure to make contact, etc.) instructions 124 may determine that mobile device 150 has been located at least a threshold distance 170 away from the identified printing device for at least a threshold amount of time when the difference between the current time and the stored time value is greater than or equal to the threshold amount of time (regardless of the current geographical location of mobile device 150). When instructions 124 determine, based on the current geographical location of mobile device 150 obtained from the cellular service provider, that mobile device 150 is less than the threshold distance 170 away from printing device 155, instructions 124 may determine that mobile device 150 has not been located at least a threshold distance 170 away from the identified printing device for at least the threshold amount of time.

In the example of FIG. 1, based on request 180 and the determination of instructions 124, instructions 126 may make the content available to an alternate content destination instead of the identified printing device. For example based on request 180 and instructions 124 determining that mobile device 150 has been located at least threshold distance 170 away from destination printing device 155 for at least the threshold amount of time, instructions 126 may make the content 182 available to an alternate content destination instead of the identified printing device.

In some examples, the alternate content destination may be an alternate printing device (different than the destination printing device 155 identified in request 180) from which mobile device 150 is located less than threshold distance 170. In some examples, a user of destination printing device 155 may associate at least one alternate printing device (and the geographical location of the alternate printing device) with printing device 155 in remote printing service 105. In such examples, when instructions 124 determine that the user's mobile device 150 is at least threshold distance 170 away from destination printing device 155 for at least the threshold amount of time, instructions 124 may determine whether mobile device 150 is less than threshold distance 170 from at least one of the alternate printing device(s) (e.g., based on a last reported location of mobile device 150 or a current location requested by service 105 from the cellular service provider). If so, then instructions 126 may make content 182 available for printing to the alternate printing device (from which mobile device 150 is less than the threshold distance), instead of printing device 155 identified in request 180. Instructions 126 may make the content available to the alternate printing device in any suitable manner.

In some examples, instructions 126 may make a print-ready version of the content 182 available to the alternate printing device. In examples described herein, a "print-ready" version of content for a given printing device may be a version of the content in a form that may be printed by the given printing device. For example, a given printing device may be able to print content in one or more of portable document format (PDF), at least one version of printer command language (PCL) format, or the like. Content in any such format that may be printed by a given printing device may be considered a "print-ready" version of the content for that printing device. Content in a format that may not be printed by a given printing device (e.g., a word processing document format, or the like), may not be considered a print-ready version of the content. In such examples, content may be rendered (e.g., converted, or the like) into a print-ready format for the destination printing device (e.g., by a remote printing service) before being made available to the printing device. In such examples, the remote printing service (e.g., instructions 126, or a computing device separate from but accessible to computing device 100) may render content to produce a print-ready version to make available to a printing device.

In some examples, instructions 126 may make content available to a given printing device (e.g., printing device 155, the alternate printing device, etc.) by obtaining or generating a print-ready version of the content for the given printing device, storing the print-ready version in storage accessible to the given printing device via a computer network, and providing, to the given printing device via a computer network, information that the given printing device may use to retrieve the print-ready version (e.g., a uniform resource identifier (URI), uniform resource locator (URL), or other any other suitable type of address or reference). In other examples, instructions 126 may make content available to a given printing device by providing a print-ready version of the content to the given printing device via a computer network.

In other examples, instructions 124 may determine that that mobile device 150 has not been located at least threshold distance 170 away from destination printing device 155 for at least threshold amount of time, because the device is not located at least the threshold distance 170 away, or has not been located at least the threshold distance 170 away for long enough (e.g., at least the threshold amount of time). For example, in the time value examples described above, instructions 124 may determine that that mobile device 150 has not been located at least threshold distance 170 away from destination printing device 155 for at least threshold amount of time when the difference between the current time and the stored time value is less than the threshold amount of time. In response to such a determination, instructions 126 may make the content 182 available to destination printing device 155 (i.e., the printing device 155 identified in request 180) in any manner as described above, or in any other suitable manner.

In some examples, the alternate content destination is a user email address associated with the identified printing device. In such examples, the user email address is different than any destination email address assigned to destination printing device 155 in remote printing service 105 (i.e., the email address to which email print jobs are sent to for destination printing device 155). Rather, the user email address may be an email address that a user of destination printing device 155 and mobile device 150 may receive email messages in their email inbox (e.g., a personal email address).

In such examples, based on request 180 and a determination by instructions 124 that mobile device 150 has been located at least a threshold distance 170 away from the identified printing device 155 for at least a threshold amount of time, instructions 126 may make the content available by providing the content via email to the user email address. In such examples, instructions 126 may provide the content via email without remote printing service 105 generating or obtaining a print-ready version of the content different than an acquired version of the content.

In some examples, instructions 126 may treat the user email address associated with printing device 155 as the alternate content destination, as described above, when either no alternate printing device(s) are associated with printing device 155 in remote printing service 105, or when mobile device 150 is not less than threshold distance 170 from any alternate printing device associated with printing device 155.

In other examples, instructions 126 may detect that request 180 comprises an indication to bypass destination selection based on mobile device location. In such examples, in response to the detection, instructions 126 may make the content available to printing device 155 (i.e., the printing device identified in request 180) (in any manner as described above, or in any other suitable manner), regardless of whether mobile device 150 has been located outside of threshold distance 170 of printing device 155 for at least the threshold amount of time. For example, the user may send an email print job including an instruction to bypass destination selection to have the email print job printed at printing device 155 regardless of the location of mobile device 150 and the amount of time mobile device 150 may have been away from printing device 155. For example, a user may utilize this feature when away from printing device 155 for an extended period, but wishing to print to printing device 155 to have the printed content waiting for them when they return.

In some examples, instructions 122, 124, and 126 may be part of an installation package that, when installed, may be executed by processing resource 110 to implement the functionalities described herein in relation to instructions 122, 124, and 126. In such examples, storage medium 120 may be a portable medium, such as a CD, DVD, or flash drive, or a memory maintained by a server from which the installation package can be downloaded and installed. In other examples, instructions 122, 124, and 126 may be part of an application, applications, or component already installed on remote printing server 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2-4.

FIG. 2 is a block diagram of an example printing environment 200 to determine whether a mobile device 150 has been away from a destination printing device 155 for at least a threshold amount of time. In the example of FIG. 2, printing environment 200 comprises a remote printing service 205, and a printing device 155 and a mobile device 150, as described above in relation to FIG. 1. Remote printing service 205 is implemented by one or more networked computing devices. System 200, which at least partially implements remote printing service 205, may be at least a portion of a computing device at least partially implementing remote printing service 205, or may comprise one or more computing devices at least partially implementing remote printing service 205.

In the example of FIG. 2, system 200 includes engines 221-226. Each of engines 221-226 of system 220 may be any combination of hardware and programming to implement the functionalities of the respective engine. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 221-226. In such examples, system 200 may include the machine-readable storage medium storing the instructions and the processing resource to execute the instructions, or the machine-readable storage medium may be separate but accessible to system 200 and the processing resource.

In some examples, the instructions can be part of an installation package that, when installed, can be executed by the processing resource to implement at least engines 221-228. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on system 200 including the processing resource. In such examples, the machine-readable storage medium may include memory such as a hard drive, solid state drive, or the like. In other examples, the functionalities of any engines of system 200 may be implemented in the form of electronic circuitry.

System 200 also includes an association repository 240. In other examples, at least a portion of repository 240 may be remote from but accessible to system 200 (e.g., via a computer network). Repository 240 may be implemented by at least one machine-readable storage medium.

In the example of FIG. 2, association engine 222 may store, in repository 240, a printing device identifier 241 identifying printing device 155 in remote printing service 205. In some examples, printing device identifier 241 may be a destination email address assigned to printing device 155 in remote printing service 205, or any other suitable identifier for printing device 155. System 200 may also store, and associate with the printing device identifier 241, several other items of information described below, thereby associating the information with printing device 155. This information may be provided to remote printing service 205 in a number of different ways. In some examples, at least some of this information may be provided to remote printing service 205 over a computer network and via a user interface of printing device 155. For example, at least some of the information may be provided to remote printing service 205 as part of a registration or out-of-box-experience (OOBE) process performed on printing device 155. In some examples, at least some of this information may be provided to remote printing service 205 by mobile device 150 via a computer network (e.g., including the Internet). In such examples, a computer application or "app" (e.g., machine-readable executable instructions) executed on mobile device 150 may provide this information to remote printing service 205 via a computer network. In some examples, some of the information may be provided by other printing device(s), other mobile device(s), or a combination thereof.

In the example of FIG. 2, association engine 222 may acquire a mobile device identifier 242 for mobile device 150 and associate mobile device identifier 242 with printing device identifier 241 in remote printing service 241. For example, mobile device identifier 242 and the association between mobile device identifier 242 and printing device identifier 241 may be stored in repository 240.

A location engine 223 may determine a geographical location 243 of destination printing device 155 and associate the location 243 of the destination printing device with the printing device identifier 241 in remote printing service 205. For example, printing device location 243 and the association between printing device location 243 and printing device identifier 241 may be stored in repository 240. As described above in relation to FIG. 1, remote printing service 205 may obtain the geographical location of printing device 155 in any suitable manner. For example, engine 223 may obtain the geographical location 243 of destination printing device 155 by obtaining the geographical location of mobile device 150 (as described above) when a user of mobile device 150 indicates that mobile device 150 is at approximately the same geographical location as destination printing device 155, as described above in relation to FIG. 1. In other examples, engine 223 may acquire a street or mailing address of a location at which printing device 155 resides (e.g., via user input at printing device 155 or mobile device 150) via a computer network. In such examples, engine 223 may determine the geographical location of printing device 155 based on the street or mailing address (e.g., using resources remote from but accessible to remote printing service 205 via the Internet, for example).

In some examples, association engine 222 may further acquire an alternate printing device identifier 244 for an alternate printing device 257 and associate the alternate printing device identifier 244 with printing device identifier 241 (to thereby associate alternate printing device 257 with printing device 155). For example, alternate printing device identifier 244 and the association between alternate printing device identifier 244 and printing device identifier 241 may be stored in repository 240. In some examples, location engine 233 may further determine a geographical location 245 of alternate printing device 257 and associate the location 245 with the printing device identifier 241 in remote printing service 205. Location 245 may be determined as described above in relation to location 243, or in any other suitable manner (e.g., using another mobile device). Alternate printing device location 245 and the association between it and printing device identifier 241 may be stored in repository 240. In some examples, engines 222 and 223 may acquire printing device identifiers and geographical locations for one or more additional alternate printing devices, such that a plurality of alternate printing devices are associated with printing device 155.

In some examples, association engine 222 may further acquire a user email address 246 and associate user email address 246 with printer device identifier 241 in remote printing service 205. For example, user email address 246 and the association between it and printing device identifier 241 may be stored in repository 240. In such examples, as described above, a user email address 246 is different than any destination email address assigned to destination printing device 155 in remote printing service 205 (i.e., the email address to which email print jobs are sent to for destination printing device 155). For example, in examples in which printing device identifier 241 is a destination email address assigned to printing device 155, user email address 246 is a different email address. As described above, the user email address may be an email address that a user of destination printing device 155 and mobile device 150 may receive email messages in their email inbox (e.g., a personal email address).

In the example of FIG. 2, acquisition engine 221 may acquire a request 280 to print content, via remote printing service 205, at a destination printing device 155 identified in request 280. Request 280 may be any suitable type of request as described above in relation to FIG. 1.

In response to request 280, determination engine 224 may determine whether, at the time of the determination, mobile device 150, associated with the destination printing device 155 by remote printing service 205, has been geographically located at least threshold distance 170 away from destination printing device 155 for at least a threshold amount of time. In some examples, engine 224 may make the determination as described above in relation to FIG. 1 (e.g., based on a stored time value), or in any other suitable manner. The threshold distance 170 may be a threshold distance, as described above in relation to FIG. 1, and the threshold amount of time may a threshold amount of time, as described above in relation to FIG. 1.

In the example of FIG. 2, remote printing service 205 may represent the association between mobile device 150 and printing device 155 by the association of printing device identifier 241 and mobile device identifier 242 stored in repository 240. In some examples, engine 224 may determine whether, at the time of the determination, mobile device 150 has been geographically located at least threshold distance 170 away from destination printing device 155 for at least the threshold amount of time from the time of the determination. In some examples, the threshold amount of time is a continuous duration of time immediately preceding the determination of whether the mobile device has been geographically located at least the threshold distance 170 away from destination printing device 155 for at least a threshold amount of time.

In the example of FIG. 2, destination engine 226 may, based on a determination by engine 224 that mobile device 150 has not been geographically located at least threshold distance 170 away from destination printing device 155 for at least the threshold amount of time, make the content 182 available to the destination printing device 155. In some examples, engine 226 may make the content 182 available to printing device 155 in any manner described above in relation to FIG. 1, or in any other suitable manner. For example, engine 226 may make a print-ready version of the content 182 available to printing device 155, as described above in relation to FIG. 1, or any other suitable manner. In some examples, making the print-ready version available may include engine 226 or another engine of system 200 rendering the content to generate the print-ready version. In such examples, based on the determination that mobile device 150 has not been geographically located at least threshold distance 170 away from the destination printing device for at least the threshold amount of time, engine 226 may make the content 182 available to printing device 155 identified in request 180 regardless of a (past or current) location of mobile device 150.

Based on a determination (by engine 224) that mobile device 150 has been geographically located at least threshold distance 170 away from the destination printing device for at least the threshold amount of time, alternate engine 225 may make the content available to an alternate content destination instead of destination printing device 155.

In some examples, based on the determination that mobile device 150 has been located at least threshold distance 170 away from destination printing device 155 for at least the threshold amount of time, engine 224 may further determine whether mobile device 150 is less than threshold distance 170 from alternate printing device 257 associated with printing device 241 in remote printing service 205 (e.g., via association of identifiers 241 and 244 in repository 240), based on alternate printing device location 245 and a geographical location of mobile device 150. In some examples, the geographical location compared to location 245 may be location reported by mobile device 150, such as a last reported geographical location of mobile device 150. In other examples, in response to the above determination, the current geographical location of mobile device 150 may be requested by service 205 from a cellular service provider providing service to mobile device 150, and that location may be compared to location 245. Based on a determination that the mobile device is less than threshold distance 170 from alternate printing device 257, and the determination that mobile device 150 has been located at least threshold 170 distance away from destination printing device 155 for at least a threshold amount of time, alternate engine 225 may make the content 182 available to alternate printing device 257, as the alternate content destination.

In some examples, engine 225 may make the content 182 available to alternate printing device 257 in any manner described above in relation to FIG. 1, or in any other suitable manner. For example, engine 225 may make a print-ready version of the content 182 available to printing device 257, as described above in relation to FIG. 1, or any other suitable manner. In some examples, a print-ready version of content for alternate printing device 257 may be the same as the print-ready version of content for printing device 155 (e.g., if both printing devices print content of the same format). In other examples, a print-ready version of content for alternate printing device 257 may be different than the print-ready version of content for printing device 155 (e.g., may be different formats).

Based on a determination that mobile device 150 is at least threshold distance 170 away from alternate printing device 257 and the determination that mobile device 150 has been geographically located at least threshold distance 170 away from destination printing device 155 for at least the threshold amount of time, alternate engine 225 may provide the content via email to user email address 246 as the alternate content destination. In some examples, when additional alternate printing device(s) are associated with printing device identifier 241, alternate engine 225 may attempt to find one of the alternate printing device(s) for which mobile device 150 is less than threshold distance 170 from alternate printing device, and may provide the content via email to user email address 246 when none is found. In some examples, printing device identifier 241 may be a destination email address assigned to printing device 155 in remote printing service 205. In such examples, the destination email address 241 and user email address 246 are different, as described above. In such examples, request 280 may comprise an email addressed to destination email address 241. For example, request 280 may comprise an email print job addressed to destination email address 241 and the content may be provided without remote printing system 205 generating or obtaining a print-ready version of the content different than an acquired version of the content, as described above in relation to FIG. 1.

In other examples, no alternate printing device(s) may be associated with printing device identifier 241, while user email address 248 is associated with printing device identifier 241 in repository 240. In such examples, alternate engine 225 may provide the content via email to user email address 248 based on a determination that mobile device 150 has been geographically located at least threshold distance 170 away from destination printing device 155 for at least the threshold amount of time. In some examples, functionalities described herein in relation to FIG. 2 may be provided in combination with functionalities described herein in relation to any of FIGS. 1 and 3-4.

Figure 3:
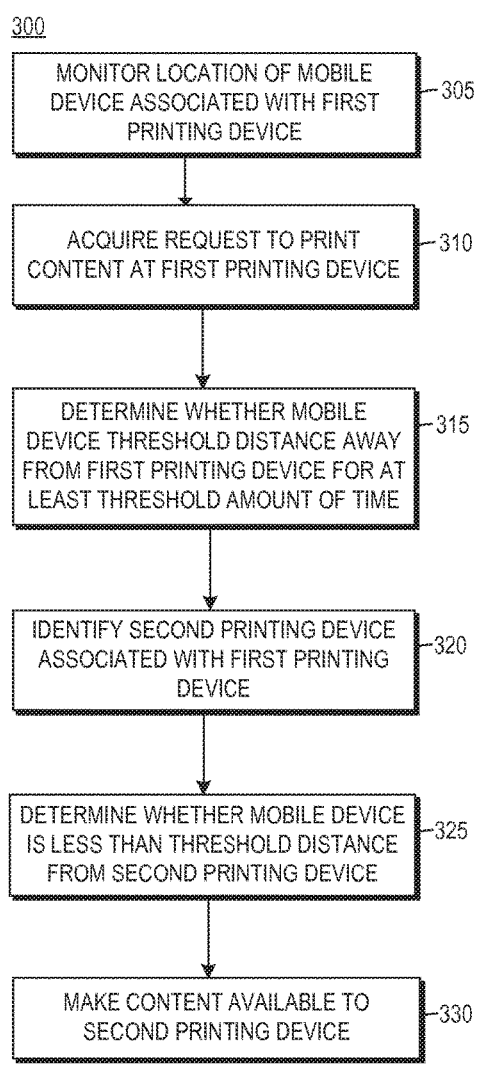
FIG. 3 is a flowchart of an example method for identifying a second printing device in response to a determination that a mobile device has been away from a first printing device for at least a threshold amount of time.

FIG. 3 is a flowchart of an example method 300 for identifying a second printing device in response to a determination that a mobile device has been away from a first printing device for at least a threshold amount of time. Although execution of method 300 is described below with reference to system 200 of FIG. 2 described above, other suitable systems for the execution of method 300 can be utilized (e.g., computing device 100). Additionally, implementation of method 300 is not limited to such examples.

At 305 of method 300, determination engine 224 of system 200 may monitor a geographical location of mobile device 150 associated with printing device identifier 241 assigned to first printing device 155 for remote printing service 205. In some examples, the monitoring by engine 224 may comprise periodically obtaining a geographical location of mobile device 150 (e.g., from mobile device 150, a cellular service provider, etc., as described above in relation to FIG. 1). In some examples, the monitoring may also include tracking a last time that mobile device 150 was found to be less than threshold distance 170 away from first printing device 155, as described above in relation to FIG. 1.

At 310, engine 221 may acquire a request 280 to print content, via remote printing service 205, at first printing device 155. At 315, engine 224 may determine whether mobile device 150 has been geographically located at least threshold distance 170 away from first printing device 155 for at least a threshold amount of time. In some examples, the threshold amount of time is a continuous duration of time immediately preceding the time of the determination. In response to a determination that mobile device 150 has been geographically located at least threshold distance 170 away from first printing device 155 for at least a threshold amount of time, alternate engine 225 may, at 320, identify a second printing device 257 associated with printing device identifier 241. In the example of FIG. 2, second printing device 257 may be associated with printing device identifier 241 via an alternate printing device identifier 244 for second printing device 257 being associated with printing device identifier 241 in repository 240.

In response to identifying second printing device 257, alternate engine 225 may, at 325, determine whether the geographical location of mobile device 150 is less than threshold distance 170 from second printing device 257. If so (i.e., in response to a determination that the location of mobile device 150 is less than threshold distance 170 from second printing device 257), then at 330, engine 225 may make the content available to second printing device 257 instead of first printing device 155. Engine 225 may make the content available to second printing device 257 in any manner as described above, or in any other suitable manner.

Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1-2 and 4.

Figure 4:
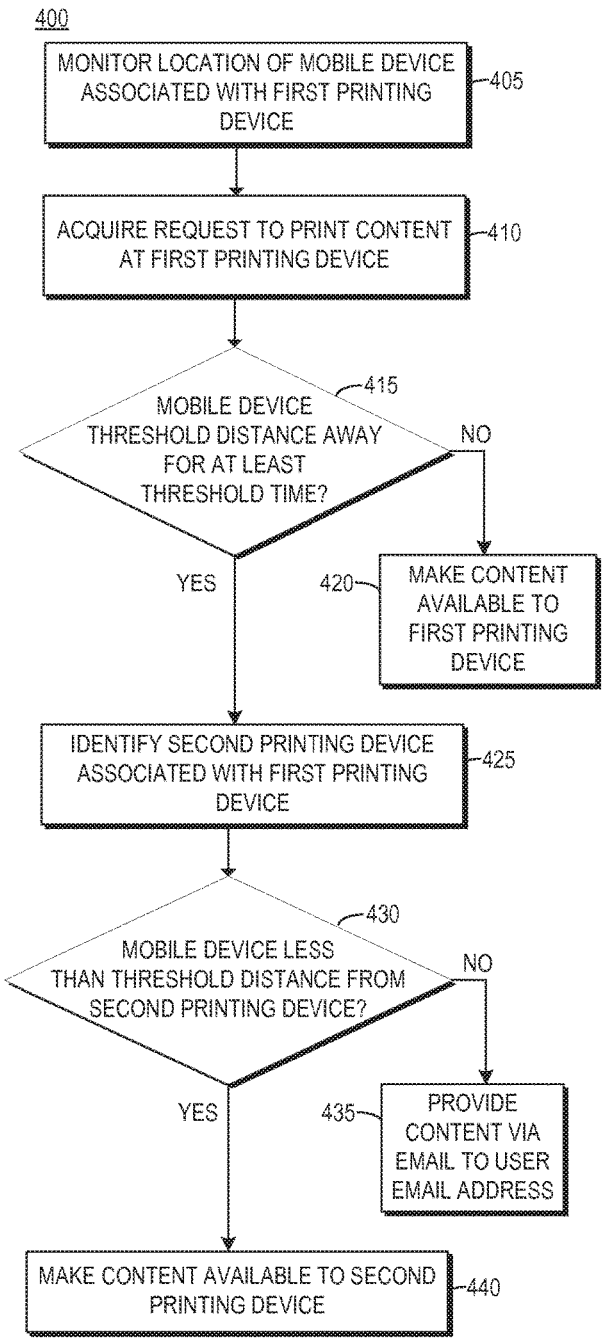
FIG. 4 is a flowchart of an example method for making content available to a printing device in response to a determination that a mobile device has not been away from the printing device for at least a threshold amount of time.

FIG. 4 is a flowchart of an example method 400 for making content available to a printing device in response to a determination that a mobile device has not been away from the printing device for at least a threshold amount of time. Although execution of method 400 is described below with reference to system 200 of FIG. 2 described above, other suitable systems for the execution of method 400 can be utilized (e.g., computing device 100). Additionally, implementation of method 400 is not limited to such examples.

At 405 of method 400, determination engine 224 of system 200 may monitor a geographical location of mobile device 150 associated with printing device identifier 241 assigned to first printing device 155 for remote printing service 205. In some examples, the monitoring by engine 224 may comprise periodically obtaining a geographical location of mobile device 150 as described above. In some examples, the monitoring may also include tracking a last time that mobile device 150 was found to be less than threshold distance 170 away from first printing device 155, as described above in relation to FIG. 1. At 410, engine 221 may acquire a request 280 to print content, via remote printing service 205, at first printing device 155.

At 415, engine 224 may determine whether mobile device 150 has been geographically located at least threshold distance 170 away from first printing device 155 for at least a threshold amount of time. If not (i.e., in response to a determination that mobile device 150 has not been geographically located at least the threshold distance away from the printing device for at least the threshold amount of time), then at 420, destination engine 226 may make the content available to first printing device 155 in any manner as described above, or in any other suitable manner. If so (i.e., in response to a determination that mobile device 150 has been geographically located at least threshold distance 170 away from first printing device 155 for at least the threshold amount of time), then at 425, alternate engine 225 may identify a second printing device 257 associated with printing device identifier 241. In the example of FIG. 2, second printing device 257 may be associated with printing device identifier 241 via an alternate printing device identifier 244 for second printing device 257 being associated with printing device identifier 241 in repository 240. In some examples, the threshold amount of time is a continuous duration of time immediately preceding the time of the determination.

In response to identifying second printing device 257, alternate engine 225 may determine, at 430, whether the geographical location of mobile device 150 is less than threshold distance 170 from second printing device 257. If not (i.e., in response to the identifying and a determination that the geographical location of mobile device 150 is not less than threshold distance 170 from second printing device 257), then at 435, alternate engine 225 may provide the content via email to a user email address associated with and different than the printing device identifier. If so (i.e., in response to a determination that the location of mobile device 150 is less than threshold distance 170 from second printing device 257), then at 440, engine 225 may make the content available to second printing device 257 instead of first printing device 155. Engine 225 may make the content available to second printing device 257 in any manner as described above, or in any other suitable manner.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3. All of the features disclosed in this specification (including any accompanying claims, abstract and drawings), and/or all of the steps of any method or process so disclosed, may be combined in any combination, except combinations where at least some of such features and/or steps are mutually exclusive.

What is claimed is:

1. A non-transitory machine-readable storage medium comprising instructions that when executed cause a processing resource of a remote printing service to:
   receive a request to print content at a particular printing device identified in the request for a mobile device;

in response to the request, determine whether the mobile device is located less than a threshold distance from the particular printing device;

in response to determination that the mobile device is located more than the threshold distance from the particular printing device, determine whether the mobile device has been located more than the threshold distance from the identified printing device for more than a threshold amount of time;

in response to a determination that the mobile device has been located more than the threshold distance from the particular printing device for more than the threshold amount of time, select an alternate content destination and send the content to the alternate content destination instead of the particular printing device; and in response to a determination that the mobile device has been located more than the threshold distance from the identified printing device for less than the threshold amount of time, send the content to the particular printing device for printing.

2. The non-transitory machine-readable storage medium of claim 1, wherein to select the alternate content destination, the instructions are to cause the processing resource of the remote printing service to select an alternate printing device located within the threshold distance from the mobile device to print the content.

3. The non-transitory machine-readable storage medium of claim 1, wherein:

the alternate content destination is a user email address associated with the particular printing device; and to make the content available to the alternate content destination, the instructions are to cause the processing resource to provide the content via email to the user email address based on the request and the determination that the mobile device has been located more than the threshold distance from the particular printing device for more than the threshold amount of time.

4. The non-transitory machine-readable storage medium of claim 1, wherein:

the request to print the content comprises an email message addressed to a destination email address assigned to the particular printing device, and the email message indicates the content to be printed.

5. The non-transitory machine-readable storage medium of claim 1, wherein the instructions to acquire comprise instructions to receive the request from a subscription service to provide different pieces of subscription content to the particular printing device in accordance with a predefined schedule, wherein the content is one of the pieces of subscription content.

6. The non-transitory machine-readable storage medium of claim 1, wherein the instructions are further to cause the processing resource to:

in response to a detection that the request to print the content includes an indication to bypass the selection of the alternate content destination, make the content available to the particular printing device regardless of whether the mobile device has been located outside of the threshold distance of the particular printing device for more than the threshold amount of time.

7. The non-transitory machine-readable storage medium of claim 1, wherein the instructions are to cause the processing resource to:

in response to a determination that the mobile device has been located more than the threshold distance of the particular printing device for less than the threshold amount of time, send the content to the particular printing device for printing.

8. A system implementing a remote printing service, the system comprising:

a processor; and a memory storing instructions that when executed cause the processor to:

acquire a request to print content at a destination printing device identified in the request;

in response to the request, determine whether, at the time of the determination, a mobile device, associated with the destination printing device, is geographically located less than a threshold distance from the destination printing device;

in response to determination that the mobile device is geographically located more than the threshold distance from the destination printing device, determine whether the mobile device has been located more than the threshold distance from the destination printing device for more than a threshold amount of time;

in response to a determination that the mobile device has been geographically located more than the threshold distance from the destination printing device for more than the threshold amount of time, select an alternate content destination and send the content to the alternate content destination instead of the destination printing device; and in response to a determination that the mobile device has been geographically located more than the threshold distance from the destination printing device for less than the threshold amount of time, send the content to the destination printing device for printing.

9. The system of claim 8, wherein the instructions are to cause the processor to:

acquire a mobile device identifier for the mobile device and associate, in the remote printing service, the mobile device identifier with a printing device identifier assigned to the destination printing device; and determine a location of the destination printing device and associate the location of the destination printing device with the printing device identifier in the remote printing service.

10. The system of claim 9, wherein the instructions to cause the processor to select an alternate content destination include instructions to cause the processor to:

select an alternate printing device as the alternate content destination and send the content to the alternate printing device for printing.

11. The system of claim 10, wherein the instructions are to cause the processor to:

acquire a user email address of a user of the mobile device and associate the user email address with the printer device identifier in the remote printing service; and based on a determination that the mobile device is located more than the threshold distance from the alternate printing device and the determination that the mobile device has been geographically located more than the threshold distance from the destination printing device for more than the threshold amount of time, select the user email address as the alternate content destination and provide the content via email to the user email address.

12. The system of claim 11, wherein:

the printing device identifier is a destination email address assigned to the destination printing device, and the request comprises an email addressed to the destination email address.

13. The system of claim 8, wherein:

the threshold amount of time is a continuous duration of time immediately preceding the determination whether the mobile device has been geographically located more than the threshold distance from the destination printing device for more than the threshold amount of time; and the instructions are to cause the processor to, based on the determination that the mobile device has been geographically located more than the threshold distance from the destination printing device for less than the threshold amount of time, make the content available to the destination printing device regardless of a location of the mobile device.

14. A method comprising:

monitoring, by a processor of a printing service, a location of a mobile device associated with a first printing device;

receiving, by the processor, a request to print content at the first printing device for the mobile device;

in response to the request, determining, by the processor, whether the mobile device is geographically located less than a threshold distance from the first printing device;

in response to a determination that the mobile device is located more than the threshold distance from the first printing device, determining, by the processor, whether the mobile device has been geographically located more than the threshold distance from the first printing device for more than a threshold amount of time;

in response to a determination that the mobile device has been geographically located more than the threshold distance from the first printing device for more than the threshold amount of time, identifying, by the processor, a second printing device located less than the threshold distance from the mobile device, and send the content to the second printing device for printing.

15. The method of claim 14, further comprising:

in response to a determination that the mobile device has been geographically located more than the threshold distance from the first printing device for less than the threshold amount of time, send the content to the first printing device for printing.

16. The method of claim 14, further comprising:

in response to a determination that the second printing device is located more than the threshold distance from the mobile device, providing the content via email to an email address of a user.

* * * * *

UNITED STATES PATENT AND TRADEMARK OFFICE
CERTIFICATE OF CORRECTION

PATENT NO. : 10,365,869 B2  
APPLICATION NO. : 15/313177  
DATED : July 30, 2019  
INVENTOR(S) : Shinoji Bhaskaran Page 1 of 1

It is certified that error appears in the above-identified patent and that said Letters Patent is hereby corrected as shown below:

In the Drawings

In sheet 2 of 3, FIG. 2, reference numeral 245, delete "ALT PRINTING" and insert -- ALTERNATE PRINTING --, therefor.

Signed and Sealed this  
Nineteenth Day of November, 2019

Andrei Iancu  
*Director of the United States Patent and Trademark Office*